(12) United States Patent
Yang et al.

(10) Patent No.: US 10,145,325 B2
(45) Date of Patent: Dec. 4, 2018

(54) SYSTEM AND METHOD FOR IDENTIFYING A POTENTIAL ENGINE STALL AND CONTROLLING A POWERTRAIN SYSTEM TO PREVENT AN ENGINE STALL

(71) Applicant: GM Global Technology Operations LLC, Detroit, MI (US)

(72) Inventors: Koon Chul Yang, Commerce Township, MI (US); You Seok Kou, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 94 days.

(21) Appl. No.: 15/008,982

(22) Filed: Jan. 28, 2016

(65) Prior Publication Data

US 2017/0218870 A1    Aug. 3, 2017

(51) Int. Cl.
| | |
|---|---|
| F02D 41/22 | (2006.01) |
| F02D 41/00 | (2006.01) |
| F02D 41/08 | (2006.01) |
| F02D 41/30 | (2006.01) |
| F16H 63/50 | (2006.01) |
| F02D 31/00 | (2006.01) |
| F02D 41/04 | (2006.01) |
| F02D 41/28 | (2006.01) |

(52) U.S. Cl.
CPC ........... *F02D 41/22* (2013.01); *F02D 31/003* (2013.01); *F02D 41/0002* (2013.01); *F02D 41/08* (2013.01); *F02D 41/083* (2013.01); *F02D 41/3005* (2013.01); *F16H 63/50* (2013.01); *F02D 31/008* (2013.01); *F02D 41/045* (2013.01); *F02D 2041/001* (2013.01); *F02D 2041/281* (2013.01); *F02D 2200/101* (2013.01); *F02D 2200/1012* (2013.01)

(58) Field of Classification Search
CPC .......................................... F02D 41/30–41/408
USPC .................. 701/103–104; 73/114.24, 114.25
See application file for complete search history.

(56) References Cited

U.S. PATENT DOCUMENTS

| | | | | |
|---|---|---|---|---|
| 4,644,922 A | * | 2/1987 | Glockler | F02D 41/126 123/491 |
| 6,278,986 B1 | * | 8/2001 | Kamihira | F02D 41/1401 701/101 |
| 6,490,517 B1 | * | 12/2002 | McGrath | F16H 63/42 477/109 |
| 6,782,868 B1 | * | 8/2004 | Doering | F02D 31/007 123/333 |
| 7,000,595 B2 | * | 2/2006 | Andersson | F02D 35/0061 123/406.47 |
| 8,386,107 B2 | * | 2/2013 | Shimanaka | B60K 6/365 180/65.25 |
| 8,676,474 B2 | * | 3/2014 | Peterson | F02D 31/007 701/1 |

(Continued)

FOREIGN PATENT DOCUMENTS

JP    2003343333 A  * 12/2003

*Primary Examiner* — Erick Solis
*Assistant Examiner* — Robert Werner

(57) ABSTRACT

A system according to the principles of the present disclosure includes an engine stall module and an actuator control module. The engine stall module identifies a potential engine stall based on a speed of an engine and a rate of change in the engine speed. The actuator control module selectively adjusts an actuator of a powertrain system to prevent the engine from stalling when a potential engine stall is identified.

19 Claims, 4 Drawing Sheets

(56) References Cited

U.S. PATENT DOCUMENTS 9,005,082 B2 * 4/2015 Okamura .............. B60W 10/06
123/361

* cited by examiner

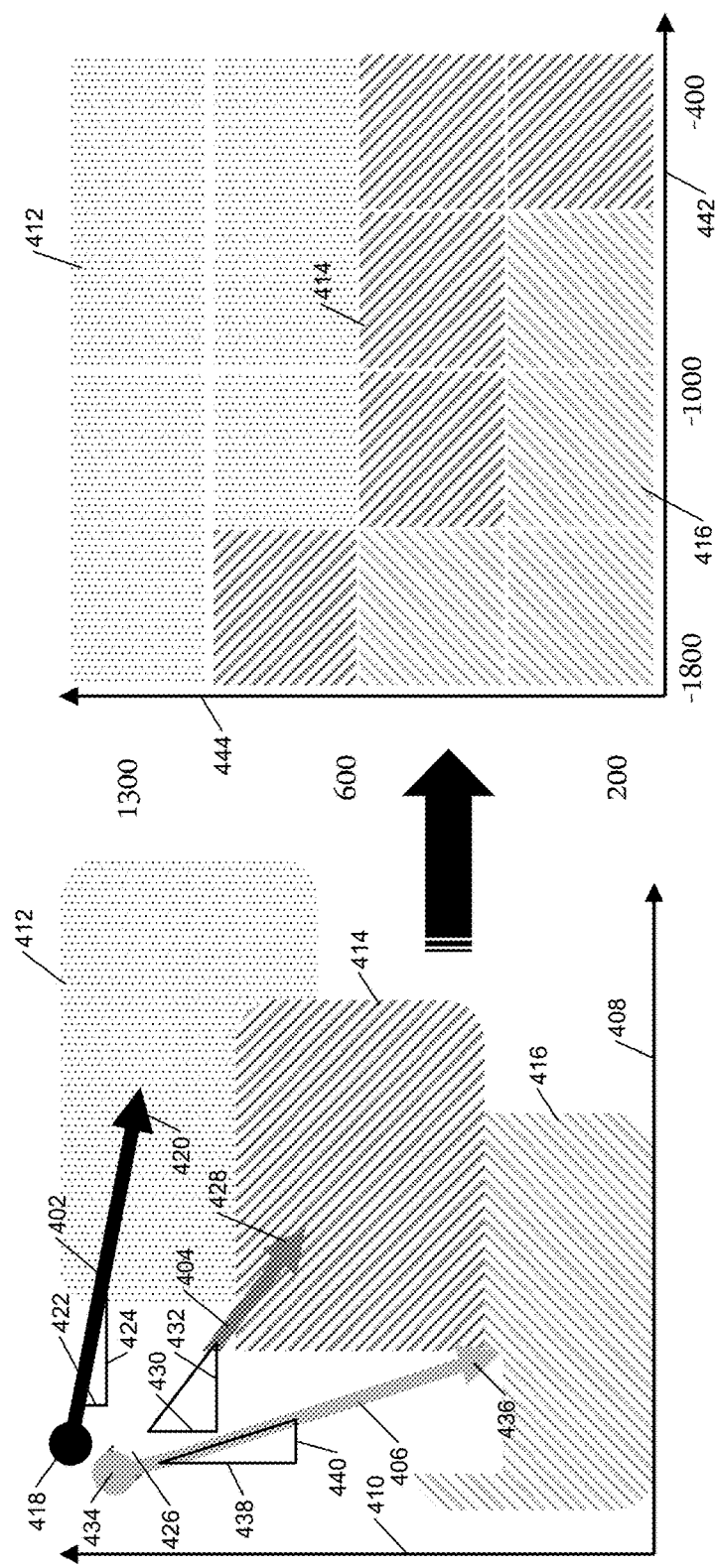

SYSTEM AND METHOD FOR IDENTIFYING A POTENTIAL ENGINE STALL AND CONTROLLING A POWERTRAIN SYSTEM TO PREVENT AN ENGINE STALL

FIELD

The present disclosure relates to internal combustion engines, and more specifically, to systems and methods for identifying a potential engine stall and controlling a powertrain system to prevent an engine stall.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

An engine may stall when the amount of air and/or fuel provided to cylinders of the engine is too much or too little. In addition, an engine may stall when a load is rapidly applied to the engine, such as when a clutch is engaged to drive an accessory, a generator, or a torque converter. Engine stalls may lead to customer dissatisfaction.

SUMMARY

A system according to the principles of the present disclosure includes an engine stall module and an actuator control module. The engine stall module identifies a potential engine stall based on a speed of an engine and a rate of change in the engine speed. The actuator control module selectively adjusts an actuator of a powertrain system to prevent the engine from stalling when a potential engine stall is identified.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A and 4B are graphs representing an example lookup table for identifying engine stall phases according to the principles of the present disclosure.

In the drawings, reference numbers may be reused to identify similar and/or identical elements.

DETAILED DESCRIPTION

Some engine control systems identify when an engine is about to stall based on the speed of the engine alone. For example, a potential engine stall may be identified when the engine speed is less than a threshold. However, identifying engine stalls in this manner may lead to a determination that an engine is not about to stall when in fact the engine is about to stall. To avoid this issue, the engine control systems use a conservative value for the threshold. In addition, to prevent an engine stall, the engine control systems prevent the engine speed from falling below the conservative threshold. Therefore, the fuel economy of the engine is not maximized.

An engine control system according to the present disclosure identifies a potential engine stall based on engine speed and a rate of change in the engine speed. Identifying engine stalls in this manner is more accurate than identifying engine stalls based on the engine speed alone. Thus, the engine speed may be allowed to decrease to below conservative thresholds used by other engine control systems, which may improve the fuel economy of the engine.

In one example, an engine control system according to the present disclosure identifies a potential engine stall based on a pseudo engine speed. The engine control system may determine the pseudo engine speed based on a measured engine speed and a difference between the measured engine speed and a target engine speed. This difference may be referred to as engine speed error. Identifying a potential engine stall based on a pseudo engine speed rather than based on the measured engine speed alone may improve the accuracy of engine stall identifications.

In another example, an engine control system according to the present disclosure filters the rate of change in the engine speed using a first-order lag filter, and identifies a potential engine stall based on the filtered rate of change in the engine speed. Filtering the rate of change in the engine speed eliminates noise and increases responsiveness. In addition, the first-order lag filter may include a coefficient that is determined based on a transmission gear state and a braking magnitude so that these parameters are taken into account when identifying a potential engine stall.

Figure 1:
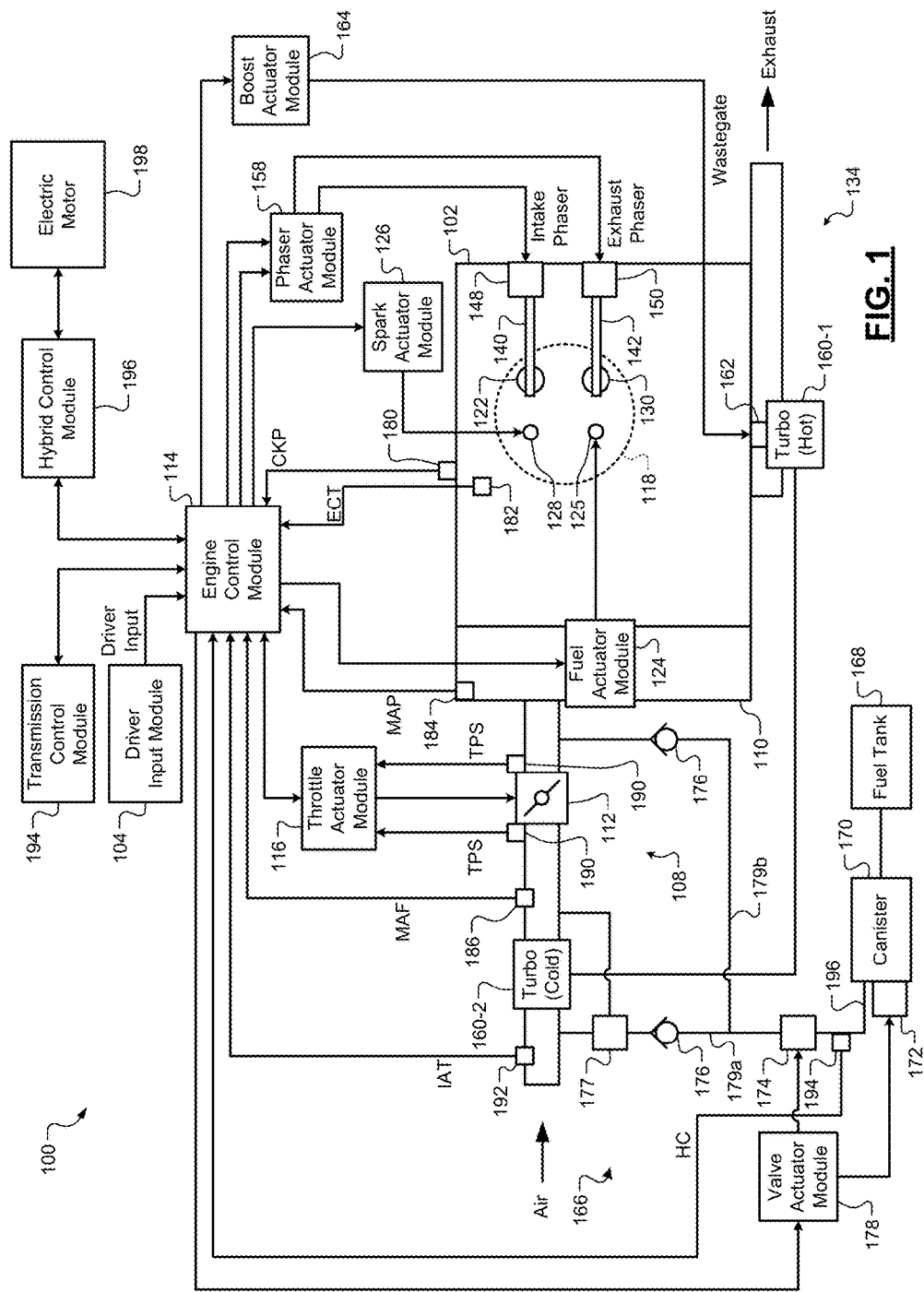
FIG. 1 is a functional block diagram of an example powertrain system according to the principles of the present disclosure.

Referring now to FIG. 1, a powertrain system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake and exhaust cam phasers 148 and 150 based on signals from the ECM 114. When implemented, variable valve lift may also be controlled by the phaser actuator module 158.

The ECM 114 may deactivate the cylinder 118 by instructing the phaser actuator module 158 to disable opening of the intake valve 122 and/or the exhaust valve 130. The phaser actuator module 158 may disable opening of the intake valve 122 by decoupling the intake valve 122 from the intake camshaft 140. Similarly, the phaser actuator module 158 may disable opening of the exhaust valve 130 by decoupling the exhaust valve 130 from the exhaust camshaft 142. In various implementations, the phaser actuator module 158 may actuate the intake valve 122 and/or the exhaust valve 130 using devices other than camshafts, such as electromagnetic or electrohydraulic actuators.

The powertrain system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

An evaporative emissions (EVAP) system 166 collects fuel vapor from a fuel tank 168 and delivers the fuel vapor to the intake system 108 for combustion in the engine 102. The EVAP system 166 includes a canister 170, a vent valve 172, a purge valve 174, check valves 176, and a jet pump 177. The canister 170 adsorbs fuel from the fuel tank 168. The vent valve 172 allows atmospheric air to enter the canister 170 when the vent valve 172 is open. The purge valve 174 allows fuel vapor to flow from the canister 170 to the intake system 108 when the purge valve 174 is open. The check valves 176 prevent flow from the intake system 108 to the canister 170. The ECM 114 controls a valve actuator module 178, which regulates the positions of the vent valve 172 and the purge valve 174. The ECM 114 may open the vent valve 172 and the purge valve 174 to purge fuel vapor from the canister 170 to the intake system 108.

Fuel vapor flows from the canister 170 to the intake system 108 through a first flow path 179a or a second flow path 179b. When the boost device is operating (e.g., when the wastegate 162 is closed), the pressure at the outlet of the first flow path 179a is less than the pressure at the outlet of the second flow path 179b. Thus, fuel vapor flows from the canister 170 to the intake system 108 through the first flow path 179a. When the boost device is not operating (e.g., when the wastegate 162 is open), the pressure at the outlet of the first flow path 179a is greater than the pressure at the outlet of the second flow path 179b. Thus, fuel vapor flows from the canister 170 to the intake system 108 through the second flow path 179b. In this regard, the first flow path 179a may be referred to as the boosted path, and the second flow path 179b may be referred to as the non-boosted path.

When the boost device is operating, the pressure of intake air upstream from the compressor 160-2 is less than the pressure of intake air downstream from the compressor 160-2. The jet pump 177 utilizes this pressure difference to create a vacuum that draws fuel vapor from the canister 170 into the intake system 108. The fuel vapor flows through the jet pump 177 and enters the intake system 108 upstream from the compressor 160-2.

In various implementations, the EVAP system 166 may include a single flow path extending from the canister 170 to the intake system 108 at a location downstream from the throttle valve 112. For example, the first flow path 179a and the components disposed therein may be omitted. In turn, the second flow path 179b may be the only path for fuel vapor to flow from the canister 170 to the intake system 108.

The powertrain system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 uses signals from the sensors to make control decisions for the powertrain system 100.

The ECM 114 may communicate with a transmission control module (TCM) 194 to coordinate shifting gears in a transmission (not shown). For example, the ECM 114 may reduce engine torque during a gear shift. The TCM 194 may disengage a torque converter (not shown) to decouple the transmission from the engine 102 during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

Figure 2:
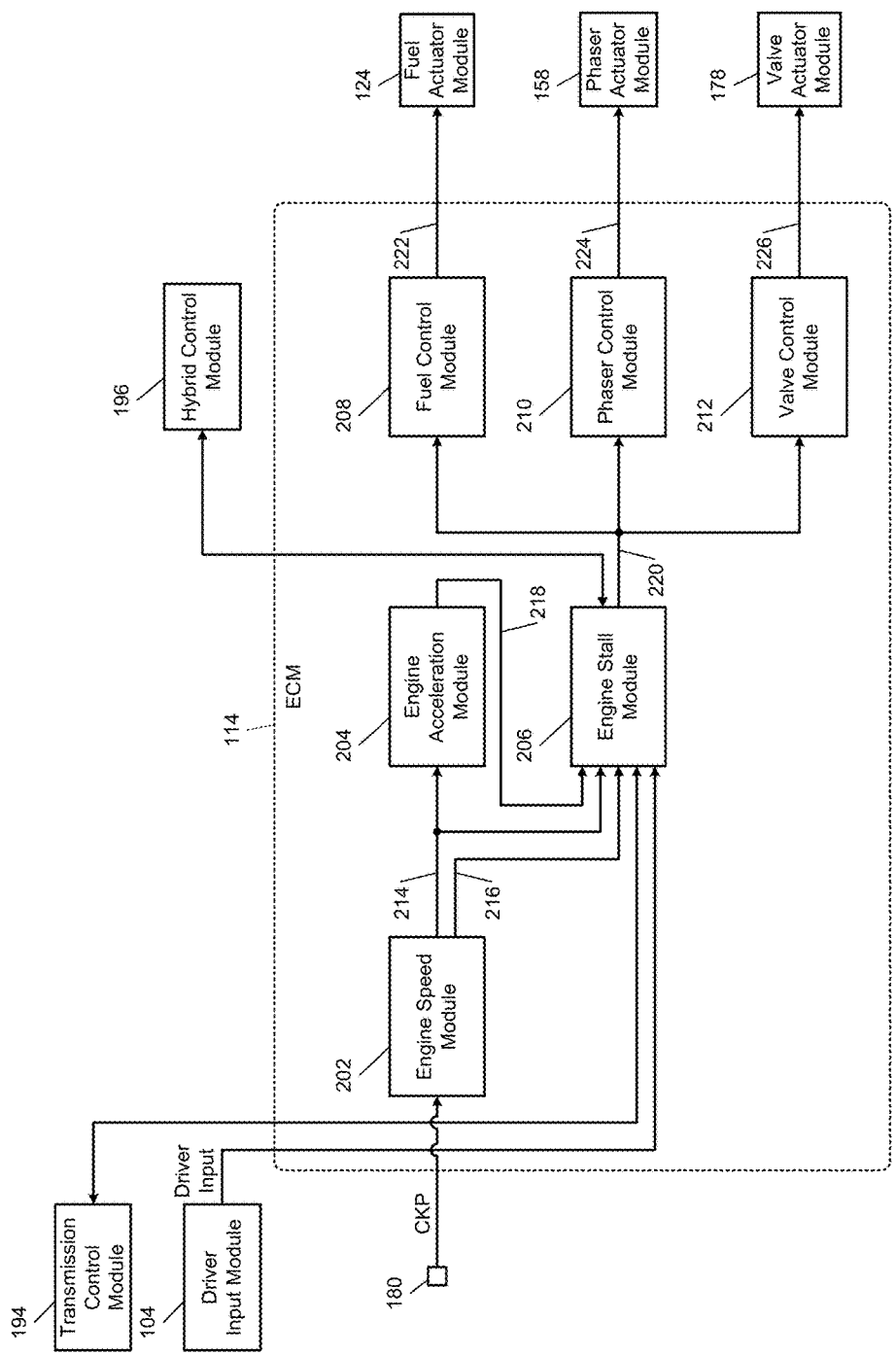
FIG. 2 is a functional block diagram of an example control system according to the principles of the present disclosure.

Referring now to FIG. 2, an example implementation of the ECM 114 includes an engine speed module 202, an engine acceleration module 204, an engine stall module 206, a fuel control module 208, a phaser control module 210, and a valve control module 212. The engine speed module 202 determines a measured engine speed. The engine speed module 202 may determine the measured engine speed based on the crankshaft position from the CKP sensor 180. For example, the engine speed module 202 may calculate the measured engine speed based on an amount by which the crankshaft rotates during a predetermined sampling period. The engine speed module 202 outputs a signal 214 indicating the measured engine speed.

The engine speed module 202 may also determine a pseudo engine speed based on the measured engine speed and/or a difference between the measured engine speed and a target engine speed. This difference may be referred to as an engine speed error. The target engine speed may be a predetermined idle speed. If the measured engine speed is greater than or equal to the target engine speed, the engine speed module 202 may set the pseudo engine speed equal to the measured engine speed. The engine speed module 202 may also set the pseudo engine speed equal to the measured engine speed if the measured engine speed is less than the target engine speed and engine speed error is less than a threshold (e.g., a predetermined value between 0 and 10 revolutions per minute). If the measured engine speed is less than the target engine speed and engine speed error is greater than or equal to the threshold, the engine speed module 202 may set the pseudo engine speed equal to the measured engine speed minus a product of a weighting factor and the engine speed error. The engine speed module 202 outputs a signal 216 indicating the pseudo engine speed.

The engine acceleration module 204 determines a rate of change in the measured engine speed, which may be referred to as an engine speed gradient or engine acceleration. The engine acceleration module 204 may determine an unfiltered value of the engine speed gradient based on multiple samples of the measured engine speed and the sampling period of the samples. For example, the engine acceleration module 204 may determine a difference between two samples of the measured engine speed and divide the difference by the period between the times when the two samples are taken to obtain the unfiltered engine speed gradient.

The engine acceleration module 204 may determine a filtered value of the engine speed gradient based on the unfiltered value of the engine speed gradient using a first-order lag filter. For example, the engine acceleration module 204 may determine the filtered engine speed gradient using the following relationship:

$$((\dot{N}_{eng})_{fltrd})_{crnt} = (1-k) \times ((\dot{N}_{eng})_{fltrd})_{prev} + k \times ((\dot{N}_{eng})_{unfltrd})_{crnt}, \tag{1}$$

where $((\dot{N}_{eng})_{fltrd})_{crnt}$ is a current value of the filtered engine speed gradient, $(\dot{N}_{eng})_{fltrd})_{prev}$ is a previous value of the filtered engine speed gradient, $((\dot{N}_{eng})_{unfltrd})_{crnt}$ is a current value of the unfiltered engine speed gradient, and k is a filter coefficient.

The engine acceleration module 204 may determine the filter coefficient based on a transmission gear state (e.g., the number or ratio of a selected or engaged gear of the transmission) and a braking magnitude. The engine acceleration module 204 may receive the transmission gear state and the braking magnitude from the TCM 194 and the driver input module 104, respectively. The engine acceleration module 204 may decrease the filter coefficient as the transmission gear state increases and vice versa. The engine acceleration module 204 may increase the filter coefficient as the braking magnitude increases and vice versa. The engine acceleration module 204 outputs a signal 218 indicating the current value of the filtered engine speed gradient.

The engine stall module 206 identifies a potential engine stall (e.g., when the engine 102 is about to stall) and/or one or more stall phases based on the pseudo engine speed and the filtered engine speed gradient using, for example, a lookup table. Each of the stall phases may represent a likelihood of a potential engine stall. In various implementations, the engine stall module 206 may determine a likelihood of a potential engine stall based on the pseudo engine speed and the filtered engine speed gradient using, for example, a lookup table. The engine stall module 206 may then identify one of the stall phases based on the likelihood of a potential engine stall.

The stall phases may include a zero phase, a first phase, and a second phase. The engine stall module 206 may determine that the engine 102 is in the zero phase when the engine 102 is not likely to stall (e.g., when the likelihood of the engine 102 stalling is zero percent). The engine stall module 206 may determine that the engine 102 is in the first phase when the engine 102 is likely to stall but a stall of the engine 102 is not imminent (e.g., when the likelihood of the engine 102 stalling is greater than zero percent and less than a predetermined percentage). The engine stall module 206 may determine that the engine 102 is in the second phase when a stall of the engine 102 is imminent (e.g., when the likelihood of the engine 102 stalling is greater than or equal to the predetermined percentage).

The engine stall module 206 outputs a signal 220 indicating whether a potential engine stall is identified and/or which stall phase that the engine 102 is experiencing. The engine stall module 206 may also determine whether the amount by which the accelerator pedal is depressed is greater than a predetermined amount (e.g., 20 percent). In this case, the signal 220 may also indicate whether the amount by which the accelerator pedal is depressed is greater than the predetermined amount.

The fuel control module 208 outputs a signal 222 to control the timing and amount of fuel injections performed by the fuel injectors of the engine 102, as well as the number of fuel injectors performed by the fuel injectors for each combustion event. The phaser control module 210 outputs a signal 224 to control the position of the intake and exhaust cam phasers 148 and 150. The valve control module 212 outputs a signal 226 to the valve actuator module 178 to control the positions of the vent valve 172 and the purge valve 174. The ECM 114, TCM 194, HCM 196, the fuel control module 208, the phase control module 210, and the valve control module 212 may be referred to as actuator control modules.

When a potential engine stall is identified, one or more of the actuator control modules may adjust the operation of their respective actuators to prevent the engine 102 from stalling. The actuator control modules may adjust the operation of their respective actuators to prevent the engine 102 from stalling when the amount by which the accelerator pedal is depressed is less than or equal to the predetermined amount. When the accelerator pedal depression is greater than the predetermined amount, the actuator control modules may not adjust the operation of their respective actuators to prevent the engine 102 from stalling regardless of whether a potential engine stall is identified.

When the engine 102 is in the first phase, the valve control module 212, the TCM 194, and the HCM 196 may adjust the operation of the purge valve 174, the torque converter, and the electric motor 198, respectively, to prevent the engine 102 from stalling. For example, the valve control module 212 may increase the opening area of the purge valve 174 when the engine 102 is operating at a rich air/fuel ratio and vice versa. In another example, the TCM 194 may disengage the torque converter to decouple the engine 102 from the transmission. In yet another example, the HCM 196 may reduce the amount of load that the electric motor 198 places on the engine 102 when the electric motor 198 is functioning as a generator. In addition, when the engine 102 is in the first phase, the ECM 114 may disengage an air conditioner (A/C) clutch and/or disable vehicle diagnostic tests that place load on the engine 102.

The actuators that are adjusted to prevent the engine 102 from stalling when the engine 102 is in the first phase may also be adjusted to prevent the engine 102 from stalling when the engine 102 is in the second phase. In addition, when the engine 102 is in the second phase, the fuel control module 208 may adjust the operation of the fuel injectors of the engine 102 to prevent the engine 102 from stalling. For example, the fuel control module 208 may increase the pulse width of the fuel injectors when the engine 102 is operating at a lean air/fuel ratio and vice versa. Further, when the engine 102 is in the second phase, the ECM 114 may increase the target engine speed to prevent the engine 102 from stalling.

The actuator control modules may continue to adjust the operation of their respective actuators to prevent the engine 102 from stalling as described above until the measured engine speed is greater than a predetermined speed. The predetermined speed may be greater than an idle speed of the engine 102 by a predetermined amount (e.g., 100 revolutions per minute). When the measured engine speed is greater than the predetermined speed, the actuator control modules stop adjusting the operation of their respective actuators to prevent the engine 102 from stalling.

Figure 3:
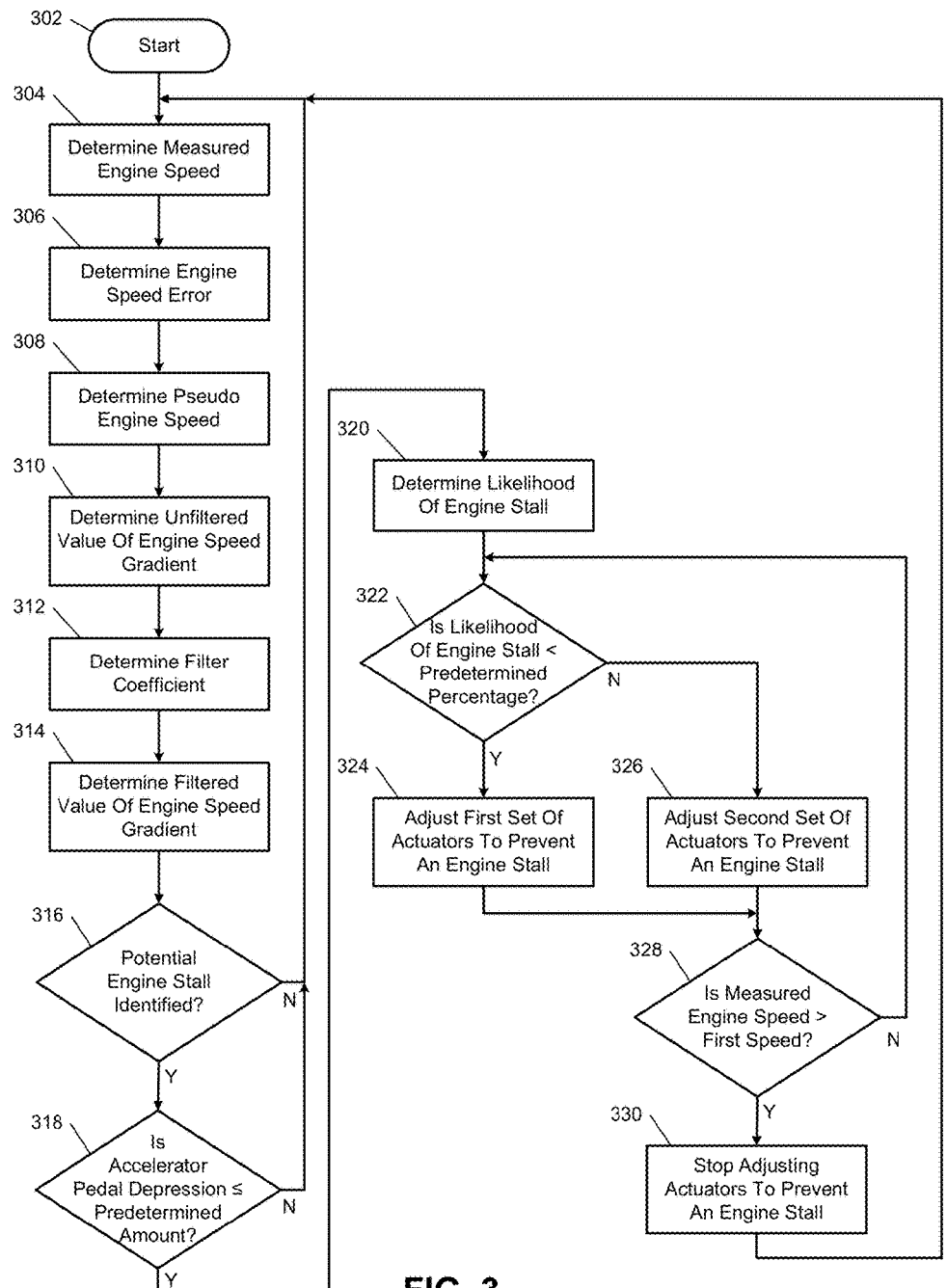
FIG. 3 is a flowchart illustrating an example control method according to the principles of the present disclosure.

Referring now to FIG. 3, a method for identifying a potential engine stall and controlling a powertrain system to prevent an engine stall begins at 302. The method is described in the context of the modules of FIG. 2. However, the particular modules that perform the steps of the method may be different than those mentioned below and/or the method may be implemented apart from the modules of FIG. 2.

At 304, the engine speed module 202 determines the measured engine speed. At 306, the engine speed module 202 determines the engine speed error (the difference between the measured engine speed and the target engine speed). At 308, the engine speed module 202 determines the pseudo engine speed. As indicated above, the engine speed module 202 may set the pseudo engine speed equal to the measured engine speed or subtract a product of the weighting factor and the engine speed error from the measured engine speed to obtain the pseudo engine speed.

At 310, the engine acceleration module 204 determines an unfiltered value of the engine speed gradient. As discussed above, the engine acceleration module 204 may determine the unfiltered engine speed gradient based on multiple samples of the measured engine speed and the sampling period of the samples. At 312, the engine acceleration module 204 determines the filter coefficient. As discussed above, the engine acceleration module 204 may determine the filter coefficient based on the transmission gear state and the braking magnitude.

At 314, the engine acceleration module 204 determines a filtered value of the engine speed gradient. As discussed above, the engine acceleration module 204 may determine the filtered engine speed gradient based on the unfiltered value of the engine speed gradient using a first-order lag filter such as that embodied in relationship (1).

At 316, the engine stall module 206 determines whether a potential engine stall is identified. As discussed above, the engine acceleration module 204 may identify a potential engine stall (e.g., when the engine 102 is about to stall) based on the pseudo engine speed and the filtered engine speed gradient using, for example, a lookup table. If a potential engine stall is identified, the method continues at 318. Otherwise, the method returns to 304.

At 318, the engine stall module 206 determines whether the amount by which the accelerator pedal is depressed is less than or equal to a predetermined amount (e.g., 20 percent). When the amount by which the accelerator pedal is depressed is less than or equal to the predetermined amount, the method continues at 320. Otherwise, the method returns to 304.

At 320, the engine stall module 206 determines the likelihood of a potential engine stall (e.g., the likelihood that the engine 102 will stall in the future). As discussed above, the engine stall module 206 may determine the likelihood of a potential engine stall based on the pseudo engine speed and the filtered engine speed gradient using, for example, a lookup table. At 322, the engine stall module 206 determines whether the likelihood of a potential engine stall is less than or equal to a predetermined percentage. If likelihood of a potential engine stall is less than or equal to the predetermined percentage, the method continues at 324. Otherwise, the method continues at 326.

At 324, the actuator control modules adjust the operation of a first set of actuators to prevent the engine 102 from stalling. The first set of actuators may include the purge valve 174, the torque converter, and the electric motor 198. The actuator control modules may adjust the operation of these actuators as described above to prevent the engine 102 from stalling. In addition, at 324, the actuator control modules may disengage an air conditioner (A/C) clutch and/or disable vehicle diagnostic tests that place load on the engine 102.

At 326, the actuator control modules adjust the operation of a second set of actuators to prevent the engine 102 from stalling. The second set of actuators may include the first set of actuators as well as the fuel injectors of the engine 102. As discussed above, to prevent the engine 102 from stalling, the fuel control module 208 may adjust the operating of the fuel injectors by increasing the pulse width of the fuel injectors when the engine 102 is operating at a lean air/fuel ratio and vice versa.

At 328, the engine stall module 206 determines whether the measured engine speed is greater than the predetermined speed. When the measured engine speed is greater than the predetermined speed, the method continues at 330. Otherwise, the method returns at 322. At 330, the actuator control modules stop adjusting the operation of their respective actuators to prevent the engine 102 from stalling.

FIG. 4A illustrates examples of engine speeds and engine speed gradients corresponding to the stall phases identified by the engine stall module 206 of FIG. 2. A first engine speed trajectory 402, a second engine speed trajectory 404, and a third engine speed trajectory 406 are plotted with respect to an x-axis 408 and a y-axis 410. The x-axis 408 represents time in seconds, and the y-axis 410 represents engine speed in revolutions per minute.

The first engine speed trajectory 402 corresponds to a zero phase 412 (e.g., a normal phase). As indicated above, the engine stall module 206 may determine that the engine 102 is in the zero phase 412 when the engine 102 is not likely to stall. The second engine speed trajectory 404 corresponds to a first phase 414. As indicated above, the engine stall module 206 may determine that the engine 102 is in the first phase 414 when the engine 102 is likely to stall but a stall of the engine 102 is not imminent. The third engine speed trajectory 406 corresponds to a second phase 416. As indicated above, the engine stall module 206 may determine that the engine 102 is in the second phase 416 when a stall of the engine 102 is imminent.

The first engine speed trajectory 402 is defined by a first initial engine speed 418, a first terminal engine speed 420, and a first engine speed gradient. The first engine speed gradient is equal to a change 422 in the first engine speed trajectory 402 divided by a corresponding period 424. The second engine speed trajectory 404 is defined by a second initial engine speed 426, a second terminal engine speed 428, and a second engine speed gradient. The second engine speed gradient is equal to a change 430 in the second engine speed trajectory 404 divided by a corresponding period 432. The third engine speed trajectory 406 is defined by a third initial engine speed 434, a third terminal engine speed 436, and a third engine speed gradient. The third engine speed gradient is equal to a change 438 in the third engine speed trajectory 406 divided by a corresponding period 440.

The relationship between the initial engine speeds 418, 426, 434 the terminal engine speeds 420, 428, 436, and the corresponding engine speed gradients may be defined as:

$$I(n_i - \int \dot{n} dt - n_t) = M_{total} \qquad (1)$$

where I is the inertia of the engine 102, $n_i$ is the initial engine speed, $\dot{n}$ is the engine speed gradient, dt is the period corresponding to the engine speed gradient, $n_t$ is the terminal engine speed, and $M_{total}$ is the total momentum of the engine 102.

When the engine stall module 206, the terminal engine speeds 420, 428, 436 are not yet known. Thus, the engine stall module 206 identifies the stall phase of the engine 102 based on the initial engine speeds 418, 426, 434 and the corresponding engine speed gradients. The engine stall module 206 may identify the stall phase of the engine 102 based on these parameters using a relationship such as relationship (1) and/or a lookup table. The lookup table may be developed based on relationship (1).

In FIG. 4B, the stall phases 412, 414, 416 are plotted with respect to an x-axis 442 representing the filtered engine speed gradient and a y-axis 444 representing the pseudo engine speed. Thus, FIG. 4B is a graphic representation of a lookup table that may be used to identify the stall phase of the engine 102 based on the filtered engine speed gradient and the pseudo engine speed. The initial engine speeds 418, 426, 434 and the corresponding engine speed gradients of FIG. 4B may be measured engine speeds and unfiltered values of engine speed gradients, respectively. Thus, the pseudo engine speeds and filtered engine speed gradients corresponding to the engine speed trajectories 402, 404, 406 may be determined based on the initial engine speeds 418, 426, 434 and the corresponding engine speed gradients. In turn, the engine stall module 206 may determine which one of the stall phases 412, 414, and 416 corresponds to each of the engine speed trajectories 402, 404, 406.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    an engine speed module that selectively sets an engine speed equal to a measured engine speed minus a product of a weighting factor and a difference between the measured engine speed and a target engine speed;
    an engine stall module that identifies a potential engine stall based on the engine speed and a rate of change in the measured engine speed; and
    an actuator control module that selectively adjusts an actuator of a powertrain system to prevent an engine from stalling when a potential engine stall is identified.

2. The system of claim 1 wherein the engine speed module sets the engine speed equal to the measured engine speed when one of:

the measured engine speed is greater than or equal to the target engine speed; and
(i) the measured engine speed is less than the target engine speed and (ii) the difference between the measured engine speed and the target engine speed is less than a predetermined value.

3. The system of claim 2 wherein the engine speed module sets the engine speed equal to the measured engine speed minus the product of the weighting factor and the difference between the measured engine speed and the target engine speed when (i) the measured engine speed is less than the target engine speed and (ii) the difference between the measured engine speed and the target engine speed is greater than or equal to the predetermined value.

4. The system of claim 1 further comprising an engine acceleration module that determines the rate of change in the measured engine speed based on multiple samples of the measured engine speed and a sampling period of the measured engine speed using a first-order lag filter.

5. The system of claim 4 wherein the engine acceleration module determines a coefficient of the first-order lag filter based on at least one of a transmission gear state and a braking magnitude.

6. The system of claim 1 wherein, when a potential engine stall is identified, the actuator control module determines whether to adjust the actuator to prevent the engine from stalling based on an accelerator pedal position.

7. The system of claim 1 wherein the engine stall module determines a likelihood of a potential engine stall based on the engine speed and the rate of change in the measured engine speed.

8. The system of claim 7 wherein the actuator control module:
adjusts a first set of actuators of the powertrain system to prevent the engine from stalling when the likelihood of a potential engine stall is less than a predetermined amount; and
adjusts a second set of actuators of the powertrain system to prevent the engine from stalling when the likelihood of a potential engine stall is greater than or equal to the predetermined amount, wherein the second set of actuators includes at least one actuator that is not included in the first set of actuators.

9. The system of claim 1 wherein actuator control module stops adjusting the actuator to prevent the engine from stalling when the measured engine speed is greater than a predetermined speed.

10. A method comprising:
selectively setting an engine speed equal to a measured engine speed minus a product of a weighting factor and a difference between the measured engine speed and a target engine speed;
identifying a potential engine stall based on the engine speed and a rate of change in the measured engine speed; and
selectively adjusting an actuator of a powertrain system to prevent an engine from stalling when a potential engine stall is identified.

11. The method of claim 10 further comprising setting the engine speed equal to the measured engine speed when one of:
the measured engine speed is greater than or equal to the target engine speed; and
(i) the measured engine speed is less than the target engine speed and (ii) the difference between the measured engine speed and the target engine speed is less than a predetermined value.

12. The method of claim 11 further comprising setting the engine speed equal to the measured engine speed minus the product of the weighting factor and the difference between the measured engine speed and the target engine speed when (i) the measured engine speed is less than the target engine speed and (ii) the difference between the measured engine speed and the target engine speed is greater than or equal to the predetermined value.

13. The method of claim 10 further comprising determining the rate of change in the measured engine speed based on multiple samples of the measured engine speed and a sampling period of the measured engine speed using a first-order lag filter.

14. The method of claim 13 further comprising determining a coefficient of the first-order lag filter based on at least one of a transmission gear state and a braking magnitude.

15. The method of claim 10 further comprising, when a potential engine stall is identified, determining whether to adjust the actuator to prevent the engine from stalling based on an accelerator pedal position.

16. The method of claim 10 further comprising determining a likelihood of a potential engine stall based on the engine speed and the rate of change in the measured engine speed.

17. The method of claim 16 further comprising:
adjusting a first set of actuators of the powertrain system to prevent the engine from stalling when the likelihood of a potential engine stall is less than a predetermined amount; and
adjusting a second set of actuators of the powertrain system to prevent the engine from stalling when the likelihood of a potential engine stall is greater than or equal to the predetermined amount, wherein the second set of actuators includes at least one actuator that is not included in the first set of actuators.

18. The method of claim 10 further comprising stop adjusting the actuator to prevent the engine from stalling when the measured engine speed is greater than a predetermined speed.

19. A system comprising:
an engine acceleration module that:
determines a rate of change in a measured speed of an engine based on multiple samples of the measured engine speed and a sampling period of the measured engine speed using a first-order lag filter; and
determines a coefficient of the first-order lag filter based on at least one of a transmission gear state and a braking magnitude;
an engine stall module that identifies a potential engine stall based on the rate of change in the measured engine speed; and
an actuator control module that selectively adjusts an actuator of a powertrain system to prevent the engine from stalling when a potential engine stall is identified.

* * * * *